May 1, 1934.  H. J. J. M. DE R. DE BELLESCIZE  1,956,711
RECEIVING APPARATUS
Filed May 14, 1929   2 Sheets-Sheet 1
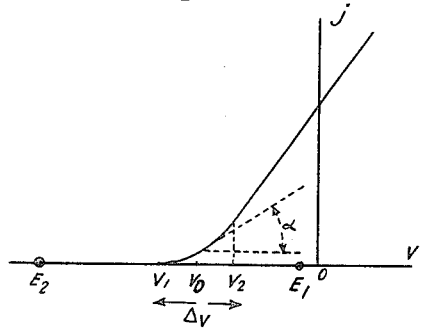
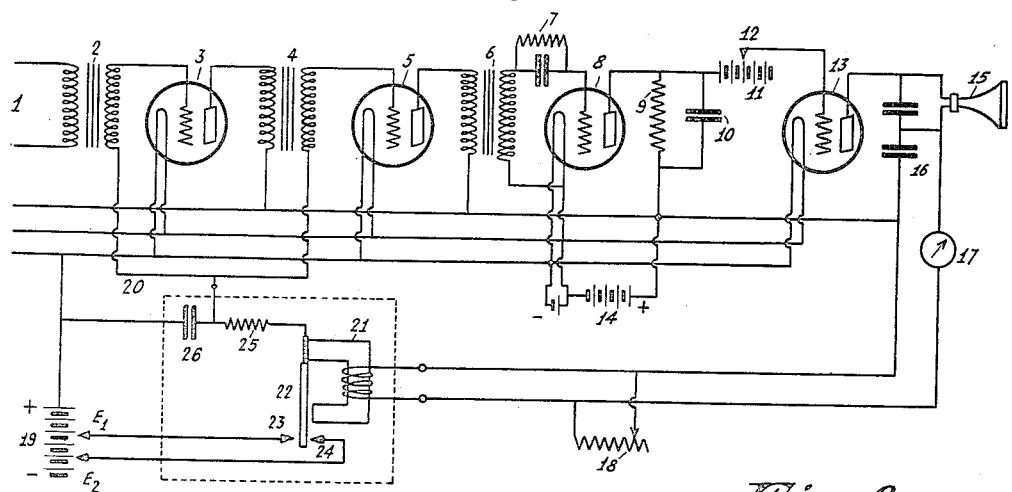
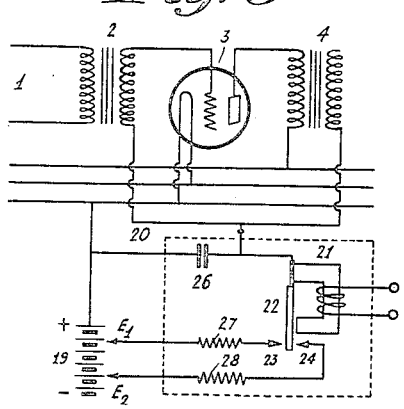
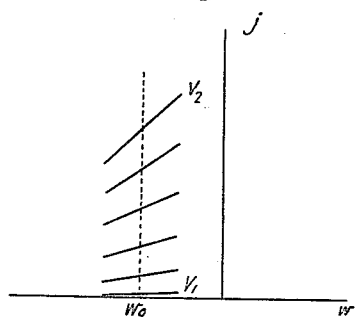
INVENTOR
H. J. J. M. De R. de BELLESCIZE
BY
ATTORNEY May 1, 1934. H. J. J. M. DE R. DE BELLESCIZE 1,956,711
RECEIVING APPARATUS
Filed May 14, 1929  2 Sheets-Sheet 2

INVENTOR
H.J.J.M. De R. De BELLESCIZE
BY H. G. Grover
ATTORNEY

Patented May 1, 1934

1,956,711

UNITED STATES PATENT OFFICE 1,956,711

RECEIVING APPARATUS

Henri Jean Joseph Marie de Regnauld de Bellescize, Paris, France, assignor to Radio Corporation of America, New York, N. Y., a corporation of Delaware Application May 14, 1929, Serial No. 362,966
In France May 22, 1928

4 Claims. (Cl. 250—20)

The present invention has as its object the disclosure of certain modifications in construction of circuit arrangements of the kind disclosed in my copending application No. 305,377, filed September 12, 1928. It also discloses certain conditions for using these schemes, especially in carrier-wave telegraphy.

The purpose is to insure automatically constancy of the signal strength at the output end of the receiver irrespective of what may be the volume of the signals at the input end, and one of the applications particularly considered is the remedy or correction of fading in the reception of signals transmitted on Hertzian waves.

Other objects of the invention will appear in the following description of the invention when read in connection with the appended drawings in which:—

Fig. 1 illustrates certain conditions existing in certain valves as utilized;

Fig. 2 shows diagrammatically a preferred embodiment of my invention;

Figure 7:
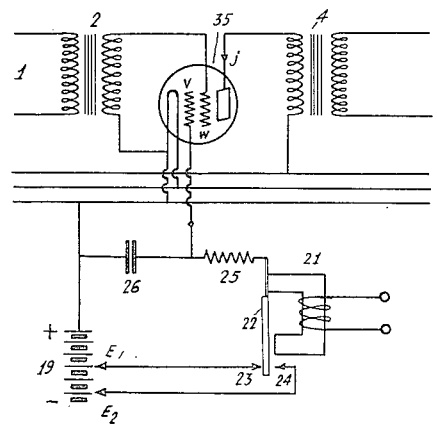

Figs. 3, 4, 5, and 6 illustrate modifications thereof utilizing three element valves;

Fig. 7 illustrates a modification of my invention as applied to a circuit employing a four element valve; and Fig. 8 diagrammatically shows conditions present in the valves as employed.

One of the embodiments based upon the fundamental idea of the invention is illustrated in Fig. 2. The oscillations constituting the signal come in at 1 either directly from the aerial or else after having been transformed or amplified in preceding parts of the set (not shown). The oscillations flow through one or more multi-electrode valves 3, 5 etc. whose sensitivity is controlled, as shall be explained, by conveniently changing the permanent potential of one of their electrodes connected with the conductor 20. The oscillations are thereupon detected in valve 8 by well-known methods, with a number of means, as will be understood, being optionally provided between valves 3—5 and detector 8. The rectified or detected current taken either directly from the detector tube or else from a valve 13 connected with the said detector by way of one or more direct current amplifier stages 9—10—11—12 operates the moving keeper 22 of an electromagnetic relay 21. Whenever the detected current due to the signal happens to be unduly strong (and this may be caused to manifest itself either by an increase or by a decrease of the permanent current flowing through the relay according to the manner of detection employed and the number of direct current amplifier stages), the keeper 22 makes contact with the contact stud 24, and condenser 26 becomes charged through resistance 25 on a source of potential $E_2$, and this potential being of a high negative value in the case of the usual tubes is chosen in such a way that, by extending sufficiently the charge of the condenser 26, conductor 20 finally assumes a potential tending to completely neutralize the sensitivity of valves 3, 5 . . . Whenever, on the contrary, the detected current should happen to be too small, the contact 23 is caused to operate and potential $E_1$ imparts to the condenser 26 a charge which, when sufficiently extended, would raise the valves 3, 5 . . . to their maximum sensitiveness. Practically, the charges of condenser 26 are not pushed to the limits where the sensitivity of the receiver is either of zero or of maximum value, but rather to a point so that the current detected will be of the desired value in order that the keeper 22 may be in equilibrium between contacts 23 and 24. The charge of condenser 26, as well as the sensitiveness of the amplifier, then, have values adapted to the intensity of strength which the incoming wave has at the instant under consideration, and they are preserved until an alteration occurs in this intensity or signal strength. The operator is able to modify at will the amplitude of the detected current flowing through the indicator 15. While the rheostat 18 fulfills this function, the same result is obtainable by any other suitable means, for instance, by keeping under more or less high tension a spring retracting the keeper 22 by using an auxiliary coil traversed by a variable current on the magnetic circuit 21, by modifying the tap 12, etc. It is to be noted that in radio telephony or telegraphy on carrier waves, the relay 21 shunted by a condenser 16 responds mainly to the mean current due to the rectification or detection of the carrier wave, while the indicator 15 follows the modulation properly so called. 17 is a controlling milliammeter.

By reference to the disclosure of the above cited application modifications are also conceivable adapted to the operation of one of the contacts 24 or 23.

In the circuit schemes shown in Figs. 2 to 6, the thermionic valves controlled as here disclosed in an automatic manner are furnished with three electrodes. The same grid receives simultaneously the oscillations of the incoming signal and the variations of potential depending upon the condenser 26 and the automatic control device. Plotting (see Fig. 1) the graph connecting the plate current $j$ and the potential of the grid $V$, the sensitiveness of the valve is proportional to tan $\alpha$, where $\alpha$ represents the angle between the tangent to the curve and the abscissa axis. Hence, the sensitiveness is of zero value for a certain value $V_1$, maximum for another value $V_2$ and of an intermediary value for intermediary potentials such as $V_0$.

Inasmuch as the problem is to compensate at each instant the variations in amplitude of the incoming wave (fading) by the aid of inverse variations of the sensitivity, it is necessary that the latter should be quite speedy.

Denoting by $E$ the potential of source 19, by $C$ the capacity of condenser 26, by $R$ the resistance of 25, and by $V_0$ the initial potential of the condenser at the instant when one of the contacts 23 or 24 is closed, the rate or the shape of change of the charge is defined by the relation:

$$V = (V_0 - E)e^{-\frac{1}{RC}t} + E$$

and its rate of speed at an instant $t$ by $$\frac{dv}{dt} = -\left(V_0 - E\right)\frac{1}{RC}e^{-\frac{1}{RC}t}$$

In first approximation, if the band $\Delta V = V_2 - V_1$ is rather narrow compared with the difference $(E_1 - V_0)$ and $(E_2 - V_0)$, it is possible to regard as constant the rates of charge between $V_1$ and $V_2$. The time $\Delta t_1$, required to charge from zero sensitiveness to maximum sensitiveness will thus be approximately $$\Delta t_1 \approx \left[\frac{\Delta v}{V_0 - E_1}\right] \times R_1 C \quad (1)$$

and the time $\Delta t_2$ to pass from maximum to zero sensitivity is $$\Delta t_2 \approx \left[\frac{\Delta v}{V_0 - E_2}\right] \times R_2 C \quad (2)$$

It will thus be seen that, in order to insure sensitiveness that will vary both rapidly and uniformly in speed inside the interval between $V_1$ and $V_2$, it is necessary to have recourse to tubes whose characteristics (Fig. 1) assume rapidly a uniform slope $\Delta V$ low, liminal potentials $E_1$ $E_2$ differing greatly from the mean value $V_0$ (which presupposes the provision of rather high plate potentials) and low time-constants RC.

These formulæ make clear also the operation in wireless telegraphy without carrier waves. The relay 21 is regulated in a way so as to respond both to dashes or dots in keying as long as these attain a convenient amplitude. Hence, a dot or dash will result in "de-sensibilization" of the receiver set, and the intervals of silence (spaces) sensibilization. It is important that these two inverse phenomena will not neutralize each other without which automatic regulation would be faulty. Hence, by means of construction, arrangements are so chosen that $$\Delta t_2 < \Delta t_1$$

In other words, de-sensibilization proceeds more rapidly than sensibilization. Hence, the sensitivity of the receiver drops gradually to the limiting value at which the relay does not rock any longer under the action of dots and dashes. This corresponds to a signal strength after detection that is perfectly definite and independent of the order of succession of dashes and dots, an advantage absent in devices disclosed in the prior art and in which the receiver is sensibilized or de-sensibilized by the agency of the quantity of electricity accumulated in the condenser traversed by the detected signals. It will be evident that this quantity of electricity there assumes a mean value without variable effect according to the nature of the signals exchanged.

In order to insure the last-mentioned condition $\Delta t_2 < \Delta t_1$ it is possible either to regulate $E_2$ and $E_1$ in such a manner that $(V_0 - E_2)$ will be higher than $(V_0 - E_1)$ or else provide two time-constants $R_1C$ and $R_2C$ of different value for sensibilization and de-sensibilization, or else again have recourse to the two methods.

In Fig. 3 the two contacts 23 and 24 charge the condenser 26 across two distinct resistances 27 and 28 which, apart from the chance of regulating the two time-constants to different values for sensibilization and de-sensibilization, avoids the risk of an accidental short-circuiting of the source 19.

Figure 4:
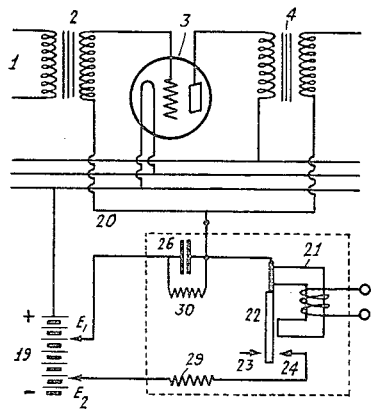

In Fig. 4 previously shown in the said copending application, the relay comprises only one useful or working contact 24. If the detected current is too strong, it attracts the keeper upon the said contact and charges the condenser 26 negatively. An unduly feeble detected current relaxes the keeper and the condenser is caused to discharge. The keeper is then subject to an uninterrupted vibratory movement.

Figure 5:
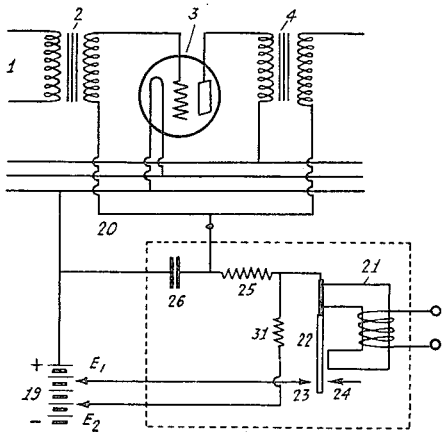

In Fig. 5, a single contact 23 is likewise used, and it serves to short-circuit through a protective resistance 31 part of the negative source 19 when the signals become too weak.

Figure 6:
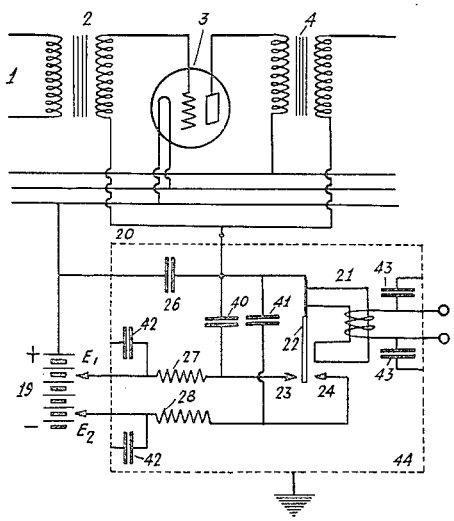

Fig. 6 shows by way of example some precautionary measures to be adopted in case the receiver happens to be particularly sensitive. The repeated cutting out and in of the source 19 is liable to produce shock action upon the antenna or the various circuits. The relay should be enclosed in a Faraday cage 44, and the production of radio frequency impulses is avoided by grounding the output wires through suitable condensers. The condenser 42 should be of as high capacity as feasible, while the condensers 40—41 should be small compared with condenser 26 which tends to discharge upon the preceding ones at the instant when the keeper leaves the contact 23 or 24. Condenser 43 should not have a capacity so that the movement of the relay is retarded or slowed up.

Fig. 7 shows a modification in which the electrode of the valve 35 serving for the automatic control of sensitiveness is not such that the signal oscillations are applied or fed thereto. Designating by $W$ the potential of the electrode receiving the signal, by $V$ the potential of the electrode serving for sensibility control, and by $j$ the current in the output electrode, the sensitivity of the valve measured or rated by $$\frac{dj}{dw}$$

should vary under the action of potential $V$, which implies that the variations $V$ modify the slope of the characterstics $j = f(W)$ around the mean working point $W_0$ (Fig. 8).

It is not necessary that the valves wherein one electrode controls the sensitiveness in an automatic manner should serve also to inter-connect the consecutive stages forming the amplifier arrangement. The control valves could be distinct from the receiver properly so called and be mounted, for instance, in such a way that their filament plate circuits or gaps shunt a certain number of the receiver circuits while their grids would respond to and follow the variations of potential of condenser 26. This would be a modification of the scheme forming the object of French Patent No. 560,208.

No matter what the particular form of construction, and whether a carrier wave is used or not for signal work, the movement of the relay should be as rapid as feasible, and it is important that slight variations of detected current will cause it to rock or oscillate inside a time that is extremely short compared with periods $\Delta t_1$ and $\Delta t_2$ of sensibilization and desensibilization.

The said durations or periods themselves could, to a certain extent, be left to the discretion of the operator in accordance with the rate of speed of the fading to be corrected and the nature of the traffic. In telegraphic work these periods will preferably be made notably larger than those of dots, dashes and spaces. The operation of condenser 26 makes it possible to adapt conditions to all circumstances. Formulæ 1 and 2 demonstrate that one could also alter the parameters $R_1$, $R_2$, $E_1$ and $E_2$.

It will finally be noted that the variations in charge of the condenser 26 do not make it absolutely necessary that the contact of keeper 22 upon contacts 23 and 24 should be perfect or zero, and that the resistance of this contact should change from zero to an infinitely high value. Variations of resistance may suffice provided they are quite large. Indeed, when a relay of any given kind is submitted to a gradually growing direct current, the resistance of the contact will never change suddenly from infinite to zero, but pass through a whole series of intermediary values being a function of the pressure and therefore of the current in the drive winding. It is probable, especially in the embodiments illustrated in Figs. 3 and 4 that a more or less large part of the automatic regulation forming the object of this invention, operates under conditions so that the contact controlled by the relay functions like a microphone contact and that the keeper is devoid of any appreciable movement.

I claim:

1. In a radio receiving system having a radio frequency amplifier, a detector circuit and an audio frequency amplifier, said radio frequency amplifier comprising at least one triode circuit, a resistance and a condenser connected to one of the electrode circuits of said triode, a potential source variably connected in said electrode circuit and in series with said condenser and resistance, said variable connection being adapted to place different potentials between the plates of said condenser, a relay device for actuating said variable connection and adapted to charge and discharge said condenser across said resistance, means to vary the speed of response of said relay, and means for actuating said relay device in accordance with the strength of the detected signal currents.

2. In radio apparatus including a radio receiver having a thermionic radio frequency amplifier feeding into a detector circuit, means for automatically controlling the sensitiveness of the radio frequency amplifier including a condenser and resistance connected to the control electrode of said radio frequency amplifier, a relay adapted to connect said condenser and said resistance in series with a source of varying potential, and means whereby the potential applied to the control electrode of said thermionic tube when the current intensity in the output circuit of said detector falls below a certain value is such that sensitivity of the radio frequency amplifier is increased, and when the current intensity goes above a predetermined value the sensitivity of the radio frequency amplifier is decreased, and means to insure decreased sensitivity at a faster rate of speed than increased sensitivity.

3. An arrangement, as defined in claim 2, wherein the means for applying the potential to the control grid of the amplifier consists of a pair of terminals, a source of biasing potential, each of said terminals being connected to said biasing source, and said relay including a mobile armature adapted to contact said terminals, and unequal resistors inserted respectively between each terminal and the said source.

4. An arrangement, as defined in claim 2, wherein the means for applying the potential to the control grid of the amplifier consists of at least one terminal and a stop device, a source of constant biasing potential, said terminal being connected to said biasing source, and said relay including a mobile armature adapted to contact said terminal or said stop.

HENRI JEAN JOSEPH MARIE DE
REGNAULD DE BELLESCIZE.